United States Patent
Kim et al.

(10) Patent No.: US 10,567,056 B2
(45) Date of Patent: *Feb. 18, 2020

(54) METHOD AND DEVICE FOR BEAMFORMING TRAINING

(71) Applicant: LG ELECTRONICS INC., Seoul (KR)

(72) Inventors: Sanggook Kim, Seoul (KR); Kyungtae Jo, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

This patent is subject to a terminal disclaimer.

(21) Appl. No.: 15/758,325

(22) PCT Filed: Sep. 19, 2016

(86) PCT No.: PCT/KR2016/010407
§ 371 (c)(1),
(2) Date: Mar. 7, 2018

(87) PCT Pub. No.: WO2017/048091
PCT Pub. Date: Mar. 23, 2017

(65) Prior Publication Data
US 2018/0254810 A1 Sep. 6, 2018

Related U.S. Application Data

(60) Provisional application No. 62/218,571, filed on Sep. 15, 2015.

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0619* (2013.01); *H04B 7/086* (2013.01); *H04W 74/085* (2013.01); *H04W 24/10* (2013.01)

(58) Field of Classification Search
CPC ... H04W 48/06; H04W 74/085; H04W 16/28; H04W 84/12
See application file for complete search history.

(56) References Cited

U.S. PATENT DOCUMENTS

| 8,817,756 B1 | 8/2014 | Hart et al. |
| 2013/0044695 A1 | 2/2013 | Xu et al. |

(Continued)

FOREIGN PATENT DOCUMENTS

WO 2015069090 5/2015

OTHER PUBLICATIONS

PCT International Application No. PCT/KR2016/010407, International Search Report dated Dec. 20, 2016, 2 pages.

*Primary Examiner* — Kent Krueger
(74) *Attorney, Agent, or Firm* — Lee Hong Degerman Kang & Waimey (57) ABSTRACT

A method for beamforming training and a device using the same are provided. The device receives, from an access point (AP), a plurality of beacon frames for a sector sweep at a beacon transmission interval (BTI). At least one of the plurality of beacon frames includes an overload indicator indicating an overload state. The device determines whether to initiate a random backoff in an association beamforming training (A-BFT) following the BTI, on the basis of the overload indicator.

13 Claims, 6 Drawing Sheets

(51) Int. Cl.
*H04W 74/08* (2009.01)
*H04W 24/10* (2009.01)

(56) References Cited

U.S. PATENT DOCUMENTS

| | | |
|---|---|---|
| 2013/0329712 A1 | 12/2013 | Cordeiro et al. |
| 2015/0103756 A1 | 4/2015 | Sinha |
| 2017/0055193 A1* | 2/2017 | Mueck ............... H04W 72/1215 |
| 2017/0086211 A1* | 3/2017 | Sahin ................... H04W 74/04 |

* cited by examiner

FIG. 6

METHOD AND DEVICE FOR BEAMFORMING TRAINING

CROSS-REFERENCE TO RELATED APPLICATIONS

This application is the National Stage filing under 35 U.S.C. 371 of International Application No. PCT/KR2016/010407, filed on Sep. 19, 2016, which claims the benefit of U.S. Provisional Application No. 62/218,571, filed on Sep. 15, 2015, the contents of which are all hereby incorporated by reference herein in their entirety.

BACKGROUND OF THE INVENTION

Field of the Invention

The present invention relates to wireless communications, and, more specifically, to a method for performing beam forming training and a device using the same.

Related Art

Institute of Electrical and Electronics Engineers (IEEE) 802.11ad standard is a very high-speed wireless communication standard that operates in a band of 60 GHz or above. Even though a signal can reach about 10 meters, the throughput may support 6 Gbps or more. Since the IEEE 802.11ad standard operates in a high frequency band, signal propagation is dominated by ray-like propagation. As a transmit (TX) or receive (RX) antenna beam is arranged toward a strong spatial signal path, signal quality thereof may be improved.

The IEEE 802.11ad standard includes a beamforming training procedure for antenna beam alignment. To achieve throughput of 20 Gbps or more, a next-generation standard that is being developed on the basis of the IEEE 802.11ad is called as an IEEE 802.11ay.

One of the requirements discussed in IEEE 802.11ay supports not only the indoor environment but also the outdoor environment. Compared with the indoor environment, there are so many devices in the outdoor environment. Frequent collisions may occur due to many devices trying to access a channel at the same time, and beamforming training or connection procedure may be delayed.

As frequent collisions are expected, beamforming training that can support connection of more devices is required.

SUMMARY OF THE INVENTION

The present invention provides a method for performing beamforming training and a device using the same.

In an aspect, a method for performing beamforming training in a wireless local area network includes receiving, by a station (STA), a plurality of beacon frames for sector sweep in a beacon transmission interval (BTI) from an access point (AP), at least one beacon frame of the plurality of beacon frames including overload information which indicates an overload state, and determining, by the STA, whether to invoke a random backoff in an association-beamforming training (A-BFT) following the BTI based on the overload information.

Determining whether to invoke the random backoff may comprise selecting, by the STA, a random value when the overload indicator indicates an overload state, and determining, by the STA, whether to invoke the random backoff in the A-BFT based on the selected random value.

In another aspect, a device for performing beamforming training in a wireless local area network includes a transceiver configured to transmit and receive a radio signal, and a processor connected to the transceiver. The processor is configured to receive a plurality of beacon frames for sector sweep in a beacon transmission interval (BTI) from an access point (AP), at least one beacon frame of the plurality of beacon frames including overload information which indicates an overload state, and determine whether to invoke a random backoff in an association-beamforming training (A-BFT) following the BTI based on the overload information.

In an environment where many devices exist, it is possible to increase the capacity of a system by adjusting the number of devices trying beamforming training according to the degree of congestion,

DESCRIPTION OF EXEMPLARY EMBODIMENTS

Hereinafter, Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user.

A basic service set (BSS) is a building block of the wireless local area network (WLAN) based on the IEEE 802.11 standard. The BSS may include a plurality of STAs which performs direct communication with each other. The WLAN may provide two types of sets: independent BSS (IBSS) and personal BSS (PBSS). The IBSS may be a basic type. The PBSS may be a type of wireless local area network (WLAN), in which the respective STAs communicate directly with each other, as an ad-hoc network. A STA in the PBSS may perform a role of the PBSS control point (PCP). The PCP may provide a beacon transmission, a service period (SP) allocation, etc.

An access point (AP) may be an entity which provides connection between multiple BSSs. One STA in the PBSS may act as the AP and another STA that belongs to different BSSs may communicate through the AP. The AP may manage the beacon transmission and association. Hereinafter, the AP and the PCP are referred to as a AP, rather than being differentiated.

The STA may include non-AP STA or AP unless a STA function and an AP function are differentiated. When communication between the STA and the AP is described, the STA may be construed as the non-AP STA. When communication between a STA and a STA is described or when the AP function is not additionally required, the STA may be the non-AP STA or the AP.

Figure 1:
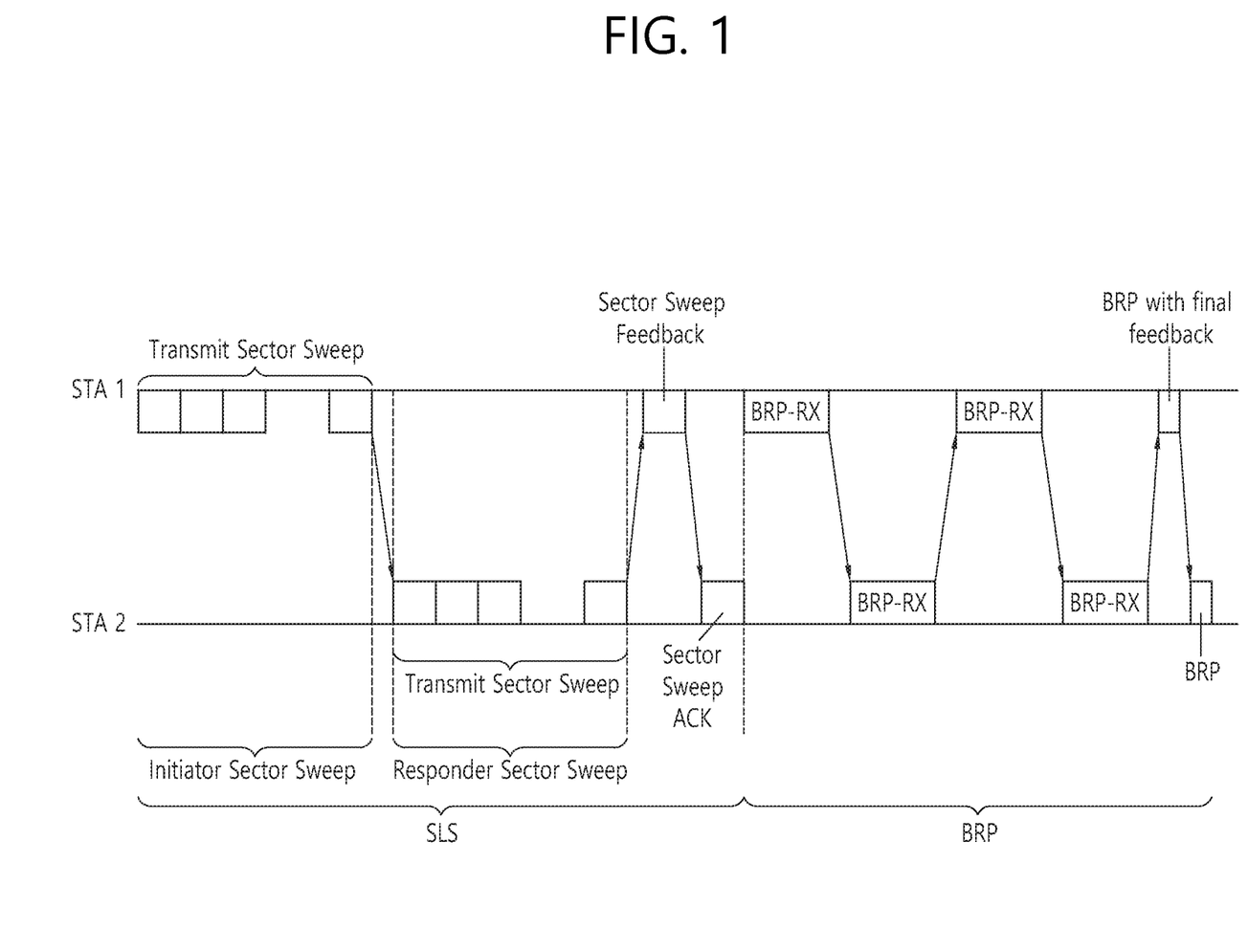
FIG. 1 shows a conventional beamforming (BF) training procedure.

FIG. 1 shows a conventional beamforming (BF) training procedure. This may refer to Section 9.35 of the IEEE 802.11ad standard.

STA1 is an initiator that initiates beamforming (BF) training. STA2 participating in the BF training is a responder.

The BF training provides transmission of a BF training frame using a sector sweep (SSW) and signaling required for each STA to determine an appropriate antenna system setting. The BF training procedure may include a sector level sweep (SLS) procedure and a beam refinement protocol (BRP) procedure. The SLS procedure for the sector sweep may allow communication between the STAs to provide a control physical layer (PHY). The BRP procedure provides refinement of an antenna weight vector between the transmitter and the receiver.

The BF training starts out with an SLS procedure by an initiator. The SLS procedure includes an indicator sector sweep (ISS) for training an initiator link, a responder sector weep for training a responder link, a sector sweep (SSW) feedback, and a SSW ACK.

During the ISS, the initiator may transmit each frame (a beacon frame or a SSW frame) in each of the sectors which the initiator has. During the RSS, the responder may transmit each of the SSW frames in each of the sectors which the responder has. During the SSW feedback, the initiator may send a SSW feedback frame to the responder. The SSW feedback frame may include information about a sector and an antenna which are selected by the initiator. The SSW ACK frame may be transmitted through a sector and an antenna which are included in the SSW feedback frame most recently received by the responder from the initiator.

A sector may correspond to a specific antenna beam or pattern. A transmit (TX) sector may be a sector for a TX antenna, and a receive (RX) sector may be a sector for a RX antenna.

Through the SLS procedure, a sector (a TX sector and/or a RX sector) in which an initiator has the best quality and a sector (a TX sector and/or a RX sector) in which a responder has the best quality may be determined.

When the SLS procedure is completed, the BRP procedure for training an RX antenna array and a TX antenna array may be initiated. The BRP procedure may include a BRP setup subphase, a multiple sector ID detection (MID) subphase, a beam combining (BC) subphase, and the like.

Figure 2:
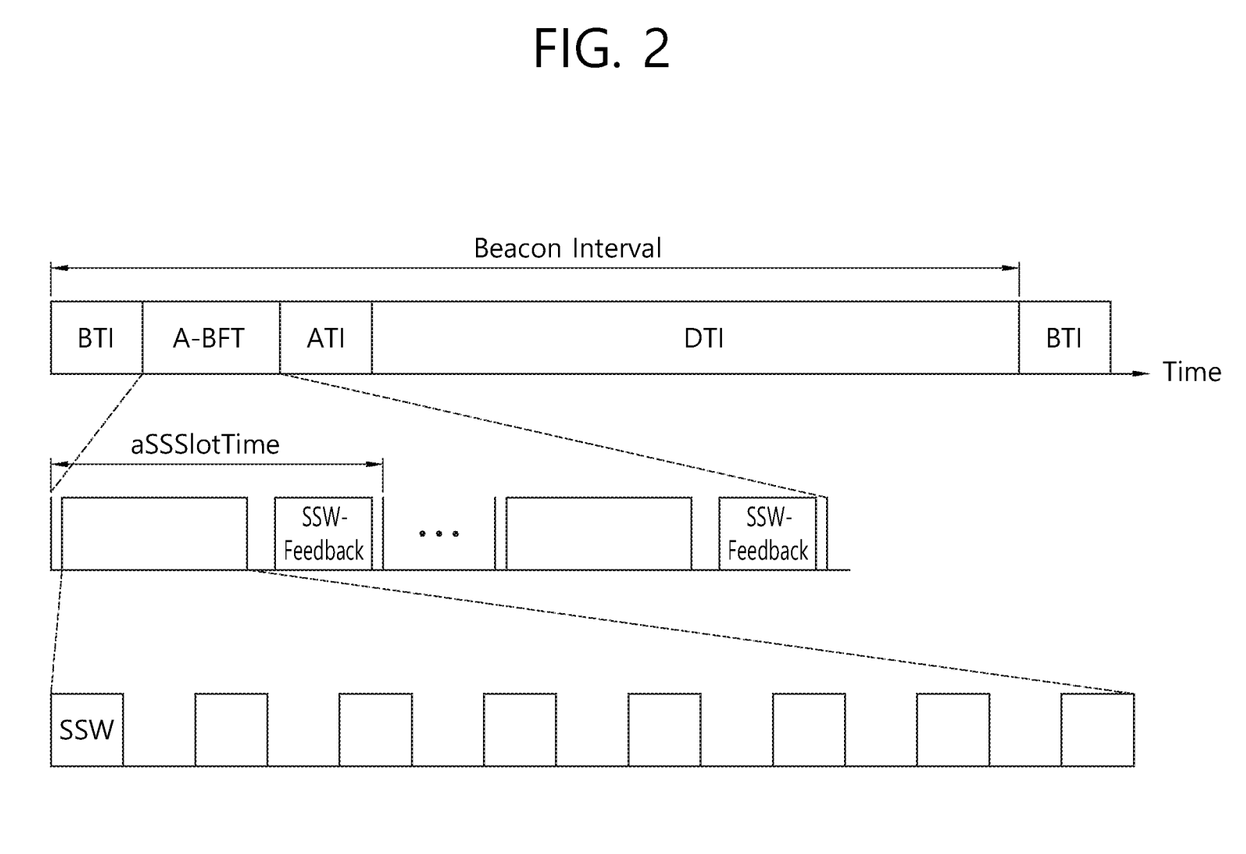
FIG. 2 shows an example of a sector level sweep (SLS) procedure.

FIG. 2 shows an example of an SLS procedure.

When an initiator is an AP and a responder is a non-AP STA, a beacon frame may be transmitted during the ISS. A beacon interval may be a time period in which a beacon frame is transmitted.

A beacon transmission interval (BTI) may be a time interval between the start of a first beacon transmission by the AP in a beacon interval to the end of a last beacon transmission by the AP in the same beacon interval. An association beamforming training (A-BFT) may be a time period including a responder sector sweep (RSS) and a SSW feedback in the SLS procedure for beamforming (BF). An announcement transmission interval (ATI) may be a time interval for managing a request-response between the AP and the STA. A data transfer interval (DTI) may be a time interval for exchanging data.

The A-BFT is performed by a unit of a SSW slot, and a length of the A-BFT is defined as a multiple of the SSW slot. A-BFT length information may be included in the beacon frame.

The SSW slot has a length of aSSSlotTime. The aSSSlotTime is defined as follows: aSSSlotTime=aAirPropagationTime+aSSDuration+ MBIFS+aSSFBDuration+MBIFS. The aAirPropagationTime is a parameter considering the propagation delay between the initiator and the responder. The aSSDuration is a time for the responder to transmit M SSW frames in the SSW slot. Information about the number M of allowed SSW frames per a SSW slot may be included in the beacon frame. FIG. 2 shows the case where M=8. Medium beamforming interface spacing (MBIFS) represents an interval between the BTI and A-BFT or an interval between ISS, RSS, SSW feedback, and SSW ACK.

At the beginning of each A-BFT, the STA as the responder may invoke a random back-off procedure to start or resume the RSS. At the beginning of the A-BFT, the STA may randomly select a backoff count from a uniform distribution [0, (A-BFT length-1)]. The STA decrements the backoff counter by one at the end of each SSW slot. The STA initiates RSS in the corresponding SSW slot when the back-off count value is 0 at the start of the SSW slot. In the corresponding SSW slot, the STA may transmit a maximum of M SSW frames. If there are more SSW frames sent by the STA, the RSS may be resumed in the next SSW slot before the A-BFT is finished. If the RSS is not completed before the A-BFT is finished, the backoff procedure may be performed again before the RSS is resumed in the next A-BFT.

The AP may send a SSW feedback before the SSW slot expires. The information included in the SSW feedback may be based on the SSW frame received in the SSW slot where the SSW feedback is transmitted. The SSW feedback may include information about a sector and an antenna which are selected by the AP.

The STA has an RSS fail count. The RSS fail count may be the number of consecutive times of failing to receive the SSW feedback in response to performing the RSS procedure during an A-BFT(s) period. For example, it may be assumed that an A-BFT period has 8 SSW slots and the STA transmits SSW frames in 4 SSW slots for 2 A-BFT periods. If the STA does not receive the SSW feedback from 3 SSW slots out of 4 SSW slots, the value of the RSS fail count is 3.

When the value of the RSS fail count exceeds the RSS retry limit, the STA selects a random value selected from the uniform distribution [0, RSSBackoff) as a backoff count. The STA reduces the backoff count by 1, one by one at the end of each A-BFT. When the backoff count reaches 0, the STA may resume the RSS in the A-BFT. When the STA receives the SSW feedback during the A-BFT, the RSS fail count may be set to 0.

In an outdoor environment, multiple STAs may initiate a BF training procedure at the same time. This means that the multiple STAs makes an attempt for a random backoff procedure during an A-BFT.

In the current beacon interval, the maximum length of an A-BFT is 8. This means that 8 SSW slots exist at maximum during an A-BFT. As multiple STAs invoke a random backoff procedure at the same time, a collision is more likely to occur and an RSS may be delayed. This may result in delayed data communications.

Figure 3:
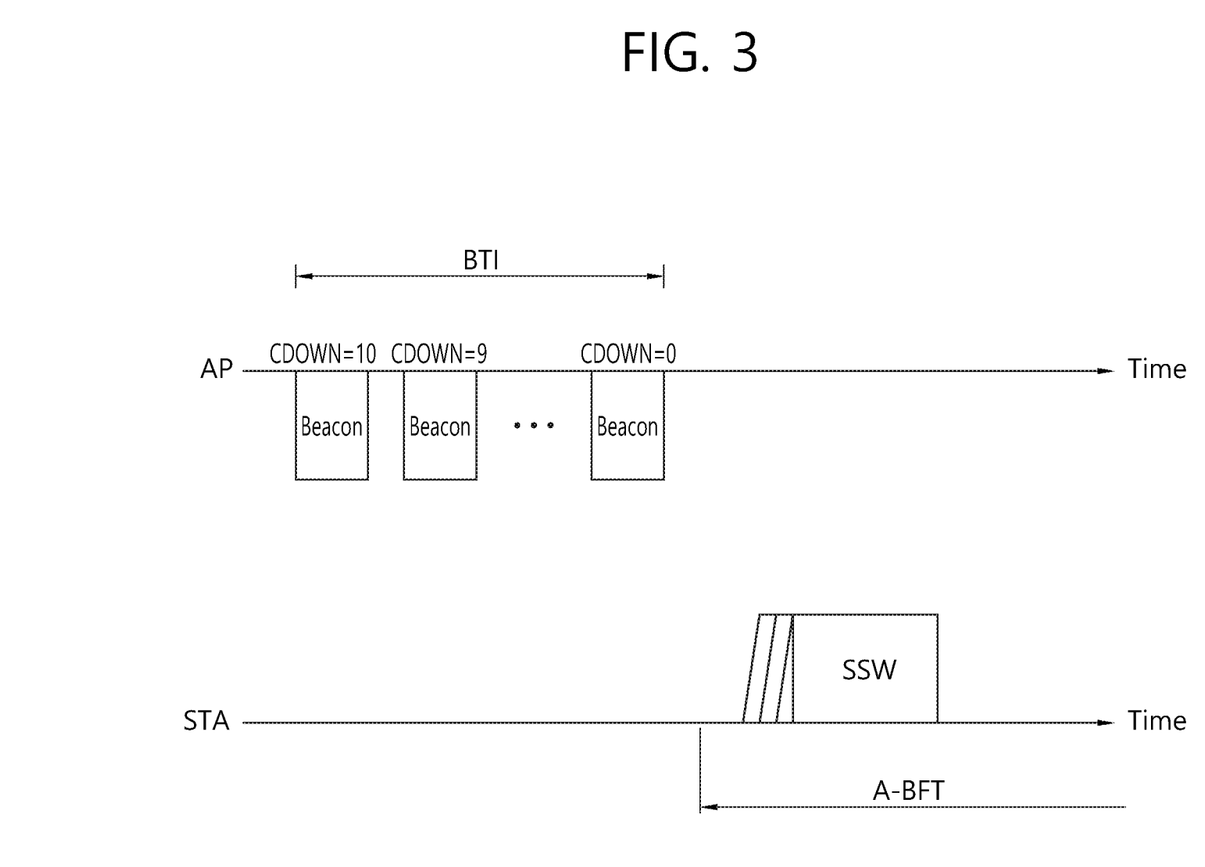
FIG. 3 shows a BF training according to an embodiment of the present invention.

FIG. 3 shows BF training according to an embodiment of the present invention.

During one or more BTIs, an AP may send one or more beacon frames to a STA through all available sectors. A beacon frame may include a down-counter (CDOWN) field, a duration field, a sector field and/or an antenna field. The DOWN field indicates the total number of remaining beacon transmissions until the end of the TX ISS. The DOWN field of the last beacon frame of TX ISS is set to 0. The duration field indicates the remaining time until the end of the current BTI. A sector field indicates a sector in which a beacon frame having this sector field is transmitted. An antenna field indicates the antenna in which the beacon frame with this sector field is used.

The beacon frame may further include an overload indicator indicating an overload state. The AP may check whether it is an overload situation, by considering SSW feedback generation, the number of connected STAs, and the like.

An overload indicator may be included in every beacon frame, but it may also be included in a beacon frame with a specific CDOWN (e.g., CDOWN=0) value. The overload indicator may have 1 bit, but this is only an example. For example, when the overload indicator is set to "0", it is not in the overloaded state, and therefore, it is possible to instruct the STA to describe the backoff described in the example of FIG. 2. When the overload indicator is set to "1", it is possible to instruct the STA to backoff as follows in the overload state.

Based on the overload indicator, the STA may determine whether to invoke the random backoff during the A-BFT which is subsequent to the current BTI. For example, when the overload indicator indicates an overload state, the STA may acquire a random value. When the random value exceeds the limit value, the STA may invoke a random backoff procedure for RSS during the corresponding A-BFT. When the random value does not exceed the limit value, the STA may omit the random backoff procedure for RSS during the corresponding A-BFT, and vice versa. The limit value may be determined in advance or may be generated from the overload indicator. Alternatively, the information on the limit value may be included in a beacon frame having an overload indicator. When the degree of congestion is severely high, only a certain number of STAs may be allowed to access the current A-BFT, thereby reducing collisions.

When the random backoff procedure is omitted, the RSS failure count may be increased by 1.

The beacon frame may include information on parameters for RSS retry (RSS retry limit and/or RSS backoff). The parameters for the RSS backoff may be dynamically adjusted to reduce collisions. This information may be included in each beacon frame, but it may be included only in a beacon frame with a specific CDOWN (e.g., CDOWN=0) value. By adjusting the RSS retry dynamically according to the degree of congestion, it is possible to reduce collisions.

Figure 4:
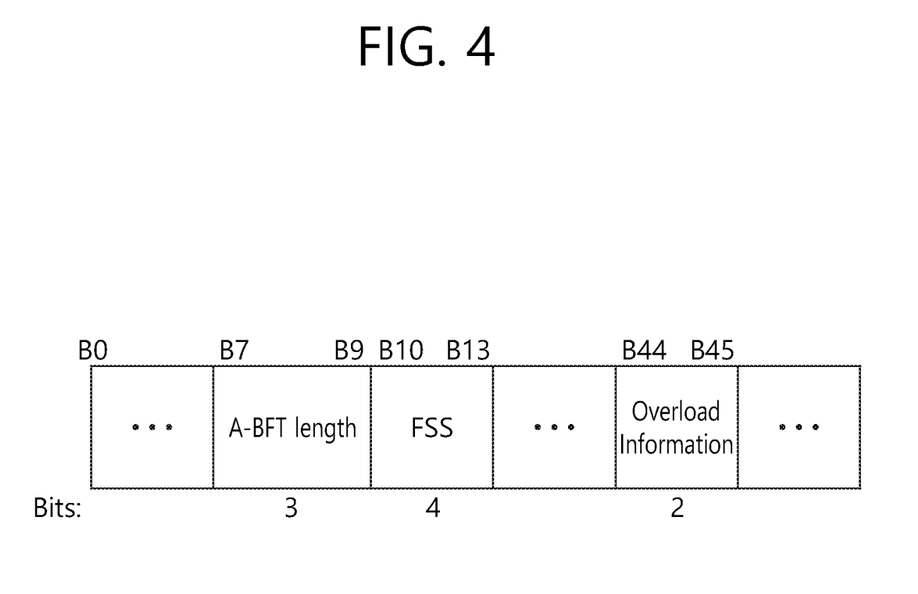
FIG. 4 shows an example of a control field included in a beacon frame.

FIG. 4 shows an example of a control field included in a beacon frame.

Although it is exemplarily shown that the control field is 48 bits, the names and the number of bits of each subfield in the control field are merely illustrative.

The length subfield of the A-BFT indicates the length of the A-BFT defined by a SSW slot unit. The value of the length subfield may have a range from 0 to 8. The FSS subfield indicates the number of SSW frames allowed for each slot of the SSW. The value of the FSS subfield may have a range from 0 to 16.

Overload information may include overload indicator, RSS retry limit and RSS backoff. The following table shows an example of use when B44 and B45 bits are used for overload information.

TABLE 1

| B44 | B45 | Description |
|---|---|---|
| 0 | 0 | It is not overloaded. RSS retry limit and RSS backoff use predefined values |
| 0 | 1 | Overload state. RSS retry limit = 6, RSS back off = 12 |
| 1 | 0 | Overload state. RSS retry limit = 4, RSS back off = 16 |
| 1 | 1 | Overload state. RSS retry limit = 2, RSS back off = 24 |

Figure 5:
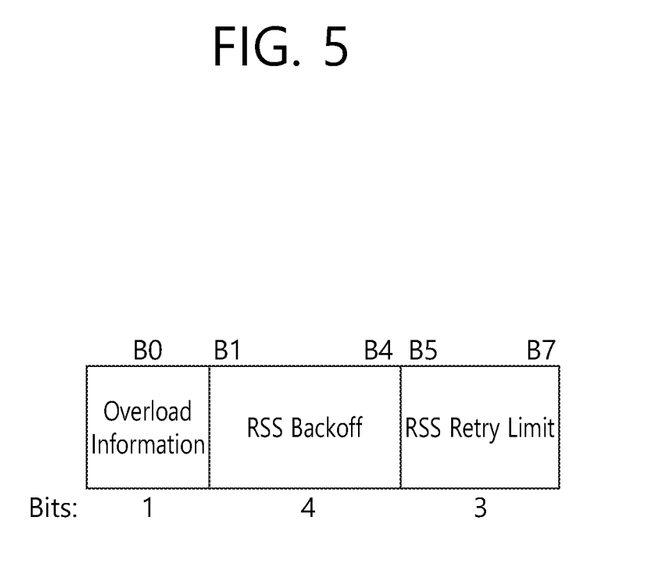
FIG. 5 shows another example of overload information.

FIG. 5 shows another example of overload information.

The overload information may be included in a beacon frame and may have a size of 8 bits. The overload indicator 510 has 1 bit, the RSS back off 520 has 4 bits and the RSS retry limit 530 has 3 bits. The number of bits of the overload information, the name of the subfield, or the number of bits is merely an example.

The following table shows an example of 4-bits RSS backoff.

TABLE 2

| Bits | Value of RSS Backoff |
|---|---|
| 0000 | 8 |
| 0001 | 10 |
| 0010 | 12 |
| 0011 | 14 |
| 0100 | 16 |
| 0101 | 18 |
| 0110 | 20 |
| 0111 | 22 |
| 1000 | 24 |
| 1001 | 26 |
| 1010 | 28 |
| 1011 | 30 |
| 1100 | 32 |
| 1101-1111 | reserved |

The following table shows example of a RSS retry limit having 3 bits.

TABLE 3

| Bits | Value of RSS Retry Limit |
|---|---|
| 000 | 8 |
| 001 | 7 |
| 010 | 6 |
| 011 | 5 |
| 100 | 4 |
| 101 | 3 |
| 110 | 2 |
| 111 | 1 |

Figure 6:
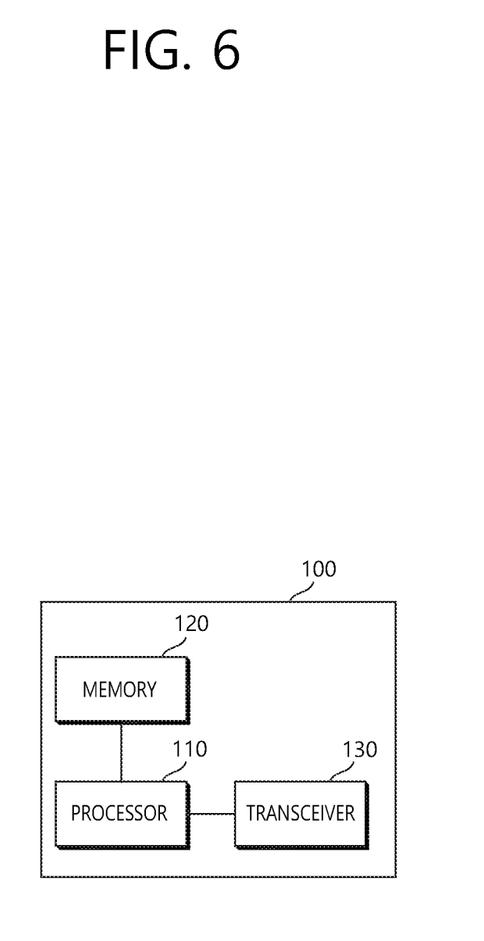
FIG. 6 is a block diagram illustrating a device in which an embodiment of the present invention is implemented.

FIG. 6 is a block diagram illustrating a device in which an embodiment of the present invention is implemented.

A device 100 may include a processor 110, a memory 120, and a transceiver 130.

The memory 120 may be coupled to the processor 110 and may store a variety of instructions which are executed by the processor 110. The transceiver 130 may be coupled to the processor 110 to transmit and/or receive radio signals. The processor 110 may implement a limited functionality, process and/or method. The operation of the STA (an initiator or responder) may be implemented by the processor 110. When the above-described embodiment is implemented in software instructions, the software instructions may be stored in the memory 120 and may be executed by the processor 110 to perform the operation described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing beamforming training in a wireless local area network, the method comprising:
   receiving, by a station (STA), a plurality of beacon frames for sector sweep in a beacon transmission interval (BTI) from an access point (AP), wherein at least one beacon frame of the plurality of beacon frames includes overload information which indicates an overload state; and
   determining, by the STA, whether to invoke a random backoff in an association-beamforming training (A-BFT) following the BTI based on the overload information.

2. The method of claim 1, wherein determining whether to invoke the random backoff comprises:
   selecting, by the STA, a random value when the overload indicator indicates an overload state; and
   determining, by the STA, whether to invoke the random backoff in the A-BFT based on the selected random value.

3. The method of claim 2, further comprising:
   increasing, by the STA, a responder sector seep (RSS) failure count by 1 when the overload indicator indicates the overload state.

4. The method of claim 3, further comprising:
   invoking, by the STA, the random backoff in a next A-BFT when the RSS failure count exceeds an RSS retry limit.

5. The method of claim 4, wherein the random value is randomly selected based on an RSS backoff.

6. The method of claim 5, wherein information about at least one of the RSS retry limit and the RSS backoff is included in at least one beacon frame of the plurality of beacon frames.

7. The method of claim 1, wherein the A-BFT comprises a plurality of sector sweep (SSW) slots.

8. The method of claim 1, wherein a beacon frame with the overload indicator has a down-counter (CDOWN) field of 0.

9. A device for performing beamforming training in a wireless local area network, the device comprising:
   a transceiver configured to transmit and receive a radio signal; and
   a processor connected to the transceiver and configured to:
   receive a plurality of beacon frames for sector sweep in a beacon transmission interval (BTI) from an access point (AP), wherein at least one beacon frame of the plurality of beacon frames includes overload information which indicates an overload state; and
   determine whether to invoke a random backoff in an association-beamforming training (A-BFT) following the BTI based on the overload information.

10. The device of claim 9, wherein the processor is configured to determine whether to invoke the random backoff by:
    selecting a random value when the overload indicator indicates an overload state; and
    determining whether to invoke the random backoff in the A-BFT based on the selected random value.

11. The device of claim 10, wherein the processor is configured to increase a responder sector seep (RSS) failure count by 1 when the overload indicator indicates the overload state.

12. The device of claim 11, wherein the processor is configured to invoke the random backoff in a next A-BFT when the RSS failure count exceeds an RSS retry limit.

13. The device of claim 12, wherein information about at least one of the RSS retry limit and the RSS backoff is included in at least one beacon frame of the plurality of beacon frames.

* * * * *